US011606313B2

(12) United States Patent
Kato

(10) Patent No.: US 11,606,313 B2
(45) Date of Patent: Mar. 14, 2023

(54) NETWORK SWITCH, NON-TRANSITORY COMPUTER-READABLE STORAGE MEDIUM, AND CONTROL METHOD

(71) Applicant: FUJITSU LIMITED, Kawasaki (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 17/329,214

(22) Filed: May 25, 2021

(65) Prior Publication Data

US 2022/0045970 A1 Feb. 10, 2022

(30) Foreign Application Priority Data

Aug. 4, 2020 (JP) .............. JP2020-132584

(51) Int. Cl.
*H04L 12/947* (2013.01)
*H04L 49/25* (2022.01)
*H04L 47/32* (2022.01)
*H04L 49/10* (2022.01)
*H04L 49/00* (2022.01)

(52) U.S. Cl.
CPC .............. *H04L 49/25* (2013.01); *H04L 47/32* (2013.01); *H04L 49/10* (2013.01); *H04L 49/70* (2013.01)

(58) Field of Classification Search
CPC ......... H04L 49/25; H04L 47/32; H04L 49/10; H04L 49/70; H04L 43/12; H04L 43/062; H04L 43/20
See application file for complete search history.

(56) References Cited

U.S. PATENT DOCUMENTS

| | | | | |
|---|---|---|---|---|
| 9,553,795 B2* | 1/2017 | Iwakura | ................ | H04L 49/208 |
| 10,264,020 B1* | 4/2019 | Nanda | ...................... | H04L 43/04 |
| 11,405,398 B2* | 8/2022 | Sakamoto | ............ | G06F 21/604 |
| 2007/0300304 A1* | 12/2007 | Lindgren | ............ | H04L 65/1104 |
| | | | | 726/24 |
| 2009/0052456 A1* | 2/2009 | Lu | .......................... | H04L 47/31 |
| | | | | 370/465 |
| 2013/0176888 A1* | 7/2013 | Kubota | ................... | H04L 45/38 |
| | | | | 370/252 |
| 2015/0281036 A1* | 10/2015 | Sun | ......................... | H04L 41/40 |
| | | | | 370/248 |
| 2016/0234091 A1* | 8/2016 | Emmadi | ............. | H04L 41/0895 |
| 2019/0116132 A1* | 4/2019 | Suzuki | .................... | G06F 9/542 |
| 2019/0132260 A1* | 5/2019 | Suzuki | ................... | H04L 47/31 |
| 2019/0306084 A1 | 10/2019 | Suzuki | | |
| 2019/0372906 A1* | 12/2019 | Baldi | ...................... | H04L 47/70 |

(Continued)

FOREIGN PATENT DOCUMENTS

| | | |
|---|---|---|
| JP | 2017-174301 A | 9/2017 |
| JP | 2018-117193 A | 7/2018 |
| WO | WO-2021044191 A1 * 3/2021 | ......... G05B 19/4185 |

*Primary Examiner* — Wutchung Chu
(74) *Attorney, Agent, or Firm* — Fujitsu Patent Center

(57) ABSTRACT

A network switch includes a field programmable gate array (FPGA) and a processor. The FPGA is configured to transfer a processing target packet to a transfer destination, based on transfer definition information, and to transfer a copy of the processing target packet to the processor. The processor is configured to delete an entry of the transfer definition information based on a transfer record information, and to update the transfer record information based on the copy of the processing target packet.

12 Claims, 10 Drawing Sheets

(56) References Cited

U.S. PATENT DOCUMENTS

| | | | |
|---|---|---|---|
| 2020/0021536 A1* | 1/2020 | Kanza | H04L 47/286 |
| 2020/0382421 A1* | 12/2020 | K. | H04L 69/22 |
| 2020/0412563 A1* | 12/2020 | Jereczek | H04L 12/4645 |
| 2020/0412598 A1* | 12/2020 | Rao | H04L 41/046 |
| 2021/0243091 A1* | 8/2021 | Raney | H04L 9/0819 |
| 2022/0029877 A1* | 1/2022 | Duda | H04L 41/0813 |

\* cited by examiner

FIG. 3

| MAC ADDRESS | Idle TIME |
|---|---|
| 00:12:34.··· | 280 [SECOND] |
| 00:56:78.··· | 270 [SECOND] |
| 00:90;ab.··· | 0 [SECOND] |

105

NETWORK SWITCH, NON-TRANSITORY COMPUTER-READABLE STORAGE MEDIUM, AND CONTROL METHOD

CROSS-REFERENCE TO RELATED APPLICATION

This application is based upon and claims the benefit of priority of the prior Japanese Patent Application No. 2020-132584, filed on Aug. 4, 2020, the entire contents of which are incorporated herein by reference.

FIELD

The present embodiment relates to a network switch, a non-transitory computer-readable storage medium, and a control method.

BACKGROUND

In recent years, a virtual network switch that realizes a function as a switch in a network by software has been known. The virtual network switch may be called a software switch.

For example, the virtual network switch forms a virtual switch in a hypervisor-type virtual environment or a container environment, and realizes a communication path for a physical switch, a virtual machine (VM), a container, and the like.

Then, by a computer executing a program for realizing the virtual network switch, a function as the virtual network switch is realized.

For example, Open vSwitch (registered trademark) is known as a program for realizing the virtual network switch. Open vSwitch realizes a virtual network switch compatible with Open Flow of open source software (OSS). Hereinafter, a processing unit that realizes the function as the virtual network switch on a computer may be referred to as a virtual network switch processing unit.

In the virtual network switch, a packet received at a physical port is transferred to, for example, a virtual port of a virtual machine that is a destination of the packet, by referring to forwarding information base (FIB). The FIB is used as routing information for controlling packet transfer.

The FIB is configured, for example, as a table with multiple entries, and each entry contains a rule and an action. The entries of the FIB are sometimes referred to as flows. The FIB is set by the virtual network switch processing unit.

In processing a plurality of packets related to one flow, the virtual network switch processing unit sets, in the FIB, a result of destination resolution performed at the time of processing the first packet. Then, for the subsequent packets, the FIB is referred to, and an action associated with a rule of the flow set in this FIB is executed.

Furthermore, it is also known that the virtual network switch is provided with a function of collecting statistical information such as, for example, idle time indicating elapsed time since the last use and the number of transmitted/received bytes, for every flow.

Furthermore, in recent years, a processor that integrates a field programmable gate array (FPGA) into a central processing unit (CPU) has appeared. In such a processor integrated with an FPGA, consistent data sharing via a memory (a main memory) may be achieved with low delay between the CPU and the FPGA.

When causing a computer equipped with such a processor integrated with the FPGA to realize the function as the virtual network switch, it is possible to achieve performance similar to that of a physical switch, by causing packet transfer while containing in the FPGA. In other words, for example, among functions realized by the virtual network switch control unit, a packet transfer function may be offloaded to the FPGA to speed up the packet transfer.

For example, when transferring a packet, in a case where a flow of the packet is registered in the FIB, the FPGA may perform the packet transfer by itself with reference to this FIB, which enables processing of the packet transfer at high speed.

Japanese Laid-open Patent Publication No. 2018-117193 and Japanese Laid-open Patent Publication No. 2017-174301 are disclosed as related art.

SUMMARY

According to an aspect of the embodiments, a network switch includes: a field programmable gate array (FPGA) configured to: transfer a processing target packet to a transfer destination, based on transfer definition information, and transfer a copy of the processing target packet to the processor; and a processor configured to: delete an entry of the transfer definition information based on a transfer record information, and update the transfer record information based on the copy of the processing target packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a view exemplifying a MAC learning table in a network switch as an example of an embodiment;

DESCRIPTION OF EMBODIMENTS

Figure 1:
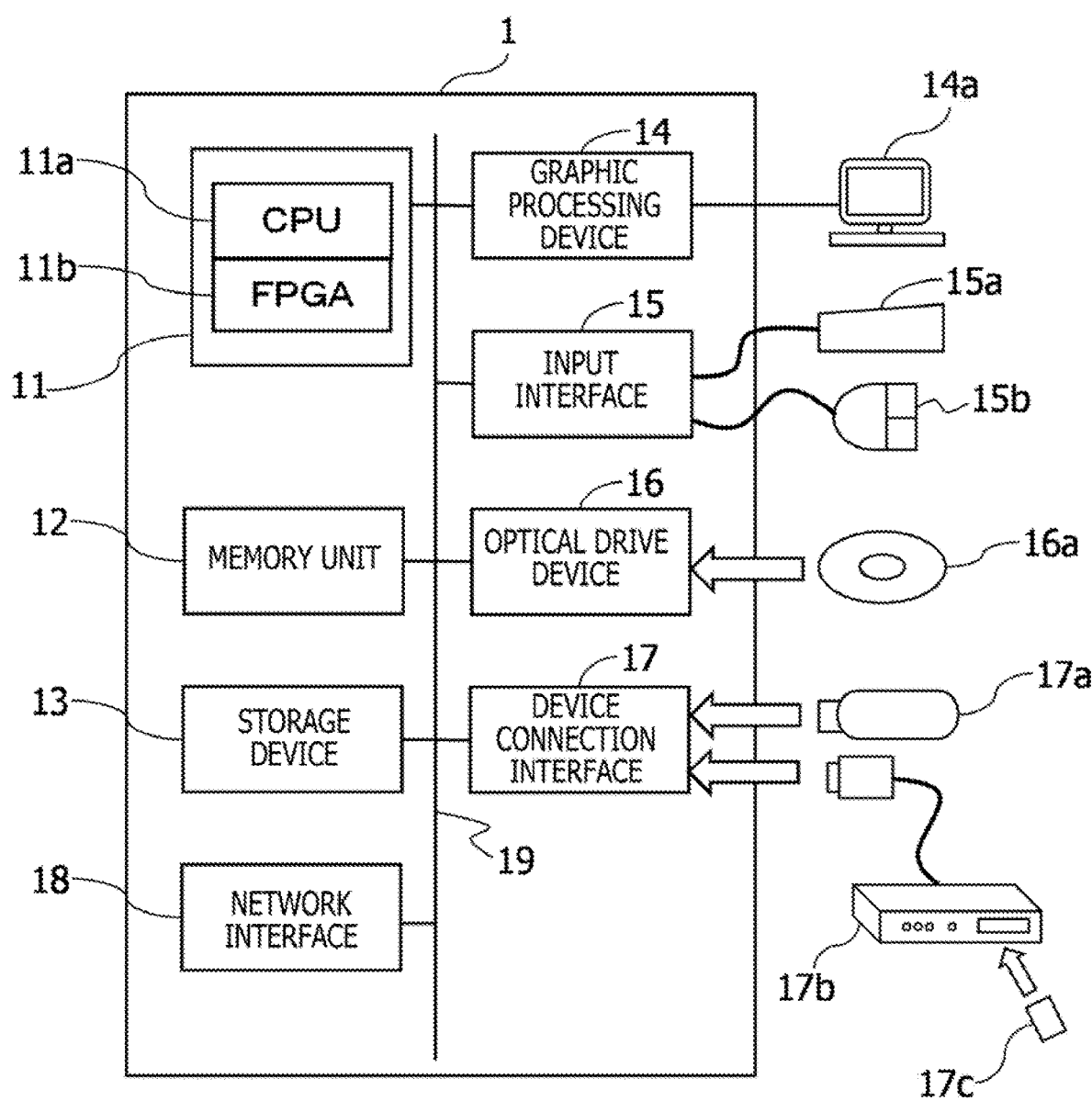
FIG. 1 is a diagram schematically illustrating a hardware configuration of a network switch as an example of an embodiment.

In the related art, when the packet transfer function is offloaded to the FPGA, it is difficult to collect statistical information. When the packet transfer function is offloaded to the FPGA, for example, it is theoretically possible to collect statistical information by adding a region for statistical information to the FIB on a main memory.

However, in this case, FIB update processing occurs every time packet processing is executed. Therefore, a usage amount of a communication band used for accessing the FIB from the FPGA increases, and throughput performance deteriorates.

Note that, it is also possible to store the FIB in a memory of the FPGA. However, for example, even if a data size of the statistical information is set to 1 bit, a data size of the statistical information is enormous at 2,000,000 bits since the number of entries in the flow table is 2,000,000. Therefore, it is not possible to store the FIB in the memory of the FPGA due to limitation of a circuit change scale of the FPGA.

Here, when the virtual network switch cannot collect statistical information, there is an adverse effect that unnecessary flows cannot be efficiently deleted from the FIB.

In the FIB, for example, it is necessary to delete a flow or the like for which transfer processing has been completed. In a virtual network switch of related technology, the flow is deleted on the basis of idle time.

However, in a virtual network switch realized by a computer equipped with the processor integrated with the FPGA, software of the virtual network switch cannot acquire the idle time by offloading the packet transfer function to the FPGA.

Therefore, instead of the idle time, by utilizing an age-out function of medium access control (MAC) addresses, it is conceivable to perform flash processing to delete the flow from the FIB when there is no communication with a MAC address of a transmission source or a destination of the flow for a predetermined time (for example, 300 seconds) (age-out).

However, when the packet transfer function is offloaded to the FPGA, the packet does not arrive the software of the virtual network switch. On the other hand, the MAC address is managed by the software of the virtual network switch, but a valid period of the MAC address is not updated since the packet does not arrive this software. Therefore, in all flows, age-out always occurs every predetermined time (for example, 300 seconds), and the flash processing associated with this causes deletion of even an active flow that is not in the idle state, from the FIB.

This causes a state where even an active flow that is not in the idle state cannot be offloaded to the FPGA, resulting in an occurrence of fragmentary performance degradation. Note that, if a packet that matches the corresponding flow arrives again, reset processing of the FIB will be performed and the offload state will be restored. However, since the packet itself is processed by the software of the virtual network switch, the performance is degraded.

In one aspect, it is an object of the present embodiment to inhibit an occurrence of unnecessary flash processing and reset processing of transfer definition information, and to avoid performance degradation.

Hereinafter, an embodiment relating to a network switch, a control program, and a control method will be described with reference to the drawings. However, the embodiment to be described below is merely an example, and there is no intention to exclude application of various modifications and techniques not explicitly described in the embodiment. In other words, for example, the present embodiment may be modified in various ways to be implemented without departing from the spirit of the embodiment. Furthermore, each drawing is not intended to include only the constituent elements illustrated in the drawing and may include other functions and the like.

(A) Configuration

FIG. 1 is a diagram schematically illustrating a hardware configuration of a network switch 1 as an example of an embodiment.

The network switch 1 is an information processing apparatus (a computer) and includes, as components, for example, an FPGA integrated processor 11, a memory unit 12, a storage device 13, a graphic processing device 14, an input interface 15, an optical drive device 16, a device connection interface 17, and a network interface 18. These components 11 to 18 are configured to be able to communicate with each other via a bus 19.

The FPGA integrated processor (a processing unit) 11 controls the entire network switch 1. The FPGA integrated processor 11 is configured by integrating a CPU (a processor) 11a and an FPGA 11b. As such an FPGA integrated processor in which a CPU and an FPGA are integrated, for example, Intel Corporation's Xeon Gold 6138P is known.

The CPU 11a may be a multiprocessor. The CPU 11a may be any one of, for example, a micro processing unit (MPU), a digital signal processor (DSP), an application specific integrated circuit (ASIC), and a programmable logic device (PLD). Furthermore, the CPU 11a may be a combination of two or more elements of the CPU, MPU, DSP, ASIC, and PLD.

Figure 2:
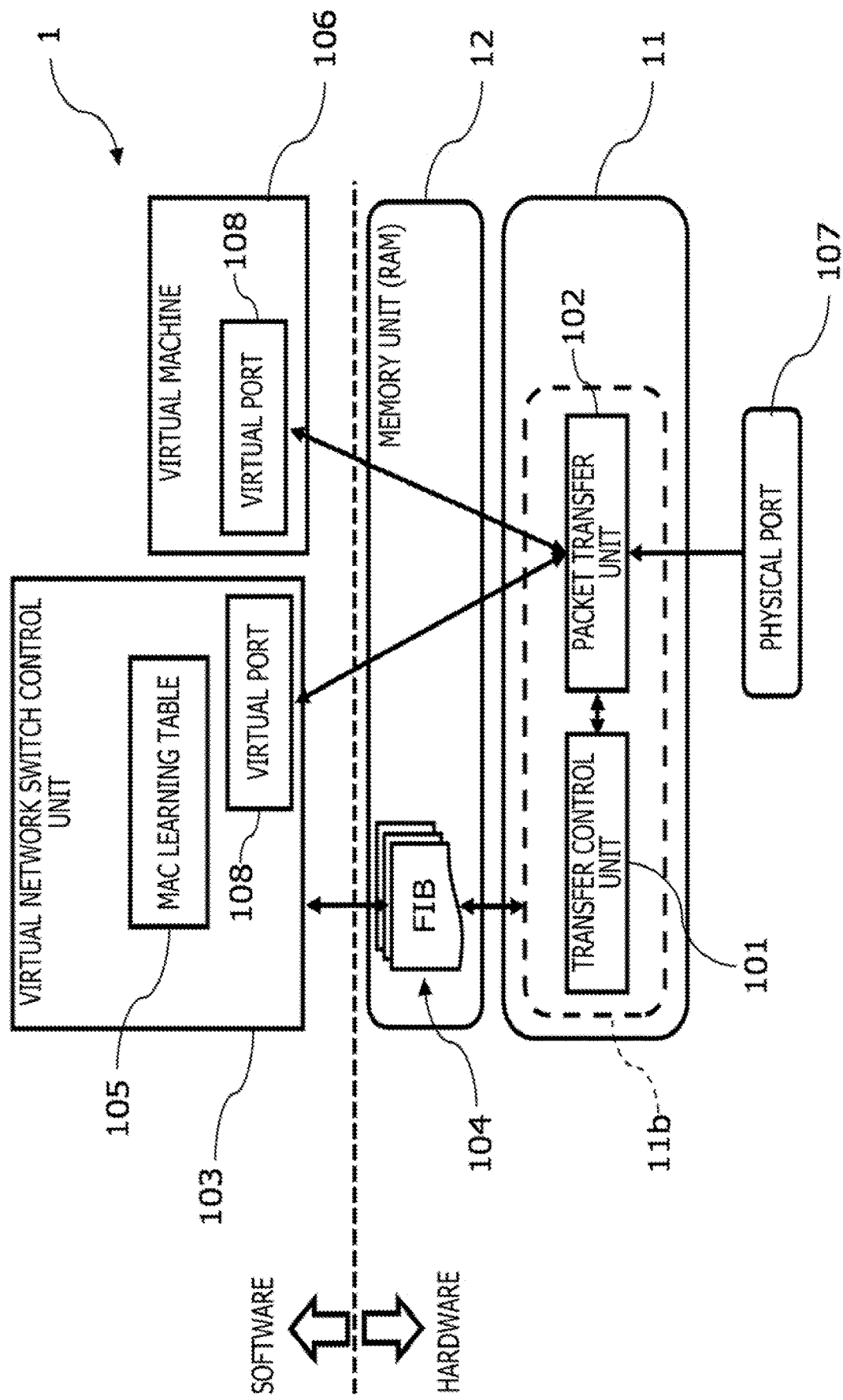
FIG. 2 is a diagram exemplifying a functional configuration of a network switch as an example of an embodiment.

Then, when the CPU 11a executes a control program (not illustrated) for the network switch 1, functions as a virtual network switch control unit 103 and a virtual machine (VM) 106, which will be described later with reference to FIG. 2, are realized.

Note that, the network switch 1 realizes functions as the virtual network switch control unit 103 and the virtual machine 106 by executing a program (a control program, an OS program) recorded on a computer-readable non-transitory recording medium, for example.

A program in which processing contents to be executed by the network switch 1 are described may be recorded in various recording media. For example, a program to be executed by the network switch 1 may be stored in the storage device 13. The CPU 11a loads at least a part of the program in the storage device 13 into a random access memory (RAM) of the memory unit 12 described later, and executes the loaded program.

Furthermore, the program to be executed by the network switch 1 (the CPU 11a) may be recorded on a non-transitory portable recording medium such as an optical disk 16a, a memory device 17a, and a memory card 17c. The program stored in the portable recording medium may be executed after being installed in the storage device 13, for example, by control from the CPU 11a. Furthermore, the CPU 11a may directly read and execute the program from the portable recording medium.

The FPGA 11b is a device capable of electrically changing a circuit design of a digital circuit. The FPGA lib is a large scale integration circuit (LSI) having a large number of logical gates. The FPGA 11b functions as a predetermined logic circuit by writing configuration data describing a logical relationship and a connection relationship between logical gates, to a configuration RAM (not illustrated) provided in the FPGA 11b.

In the network switch 1, the FPGA 11b realizes functions as a transfer control unit 101 and a packet transfer unit 102, which will be described later with reference to FIG. 2.

The memory unit 12 is a storage memory including a read only memory (ROM) and a RAM. The memory unit 12 is used as a main storage device of the network switch 1. The RAM temporarily stores at least a part of the program to be executed by the CPU 11a. Furthermore, the memory unit 12 stores various data needed for processing by the CPU 11a and the FPGA 11b. Furthermore, the RAM of the memory unit 12 may store information constituting an FIB 104 and a MAC learning table 105, which will be described later.

The storage device 13 is a storage device such as a hard disk drive (HDD), a solid state drive (SSD), or a storage class memory (SCM), and stores various data. The storage device 13 stores an OS program, a control program, and various data.

Note that a semiconductor storage device such as an SCM or a flash memory may be used as the auxiliary storage device. Furthermore, redundant arrays of inexpensive disks (RAID) may be formed by using a plurality of the storage devices 13.

The graphic processing device 14 is connected to a monitor 14a. The graphic processing device 14 displays an image on a screen of the monitor 14a in accordance with a command from the CPU 11a. Examples of the monitor 14a include a display device using a cathode ray tube (CRT), a liquid crystal display device, or the like.

The input interface 15 is connected to a keyboard 15a and a mouse 15b. The input interface 15 transmits signals sent from the keyboard 15a and the mouse 15b to the FPGA integrated processor 11. Note that the mouse 15b is one example of a pointing device, and another pointing device may also be used. Examples of the another pointing device include a touch panel, a tablet, a touch pad, a track ball, or the like.

The optical drive device 16 reads data recorded on the optical disk 16a by using laser light or the like. The optical disk 16a is a non-transitory portable recording medium having data recorded in a readable manner by reflection of light. Examples of the optical disk 16a include a digital versatile disc (DVD), a DVD-RAM, a compact disc read only memory (CD-ROM), a CD-recordable (R)/rewritable (RW), or the like.

The device connection interface 17 is a communication interface for connecting the peripheral devices to the network switch 1. For example, the device connection interface 17 may be connected to the memory device 17a and a memory reader/writer 17b. The memory device 17a is a non-transitory recording medium having a communication function with the device connection interface 17, and is, for example, a universal serial bus (USB) memory. The memory reader/writer 17b writes data to the memory card 17c or reads data from the memory card 17c. The memory card 17c is a card-type non-transitory recording medium.

The network interface 18 is connected to a network. The network interface 18 transmits and receives data via the network. Other information processing devices, communication devices, and the like may be connected to the network.

FIG. 2 is a diagram exemplifying a functional configuration of the network switch 1 as an example of the embodiment.

As illustrated in FIG. 2, the network switch 1 includes functions as the transfer control unit 101, the packet transfer unit 102, the virtual network switch control unit 103, and the virtual machine 106.

As described above, the functions as the transfer control unit 101 and the packet transfer unit 102 are realized by the FPGA 11b. Furthermore, the functions as the virtual network switch control unit 103 and the virtual machine 106 are realized by the CPU 11a. The number of the virtual machines 106 is not limited to one, and may be changed as appropriate.

—Virtual Machine 106—

The virtual machine 106 is, for example, a virtual computer created on an application program such as a hypervisor. The virtual machine 106 executes various processing similarly to a computer realized by physical hardware. For example, the virtual machine 106 executes various OSs (guest OSs) and application programs running on this guest OSs. Note that, the virtual machine 106 may be realized by a known method, and the description thereof will be omitted. Furthermore, instead of the virtual machine 106, another virtualization platform technology such as a container may be used, and may be implemented by changing as appropriate.

The virtual machine 106 includes a virtual port 108, and transmits and receives packets through the virtual port 108. The packet transfer unit 102, which will be described later, transmits a packet to the virtual port 108 as a destination.

—Transfer Control Unit 101—

The transfer control unit 101 controls packet transfer by the packet transfer unit 102. When a physical port 107 receives a packet, the transfer control unit 101 refers to the FIB 104 on the basis of a flow of the packet and checks whether a corresponding flow is set in the FIB 104. When the corresponding flow is set in the FIB 104, the transfer control unit 101 causes the packet transfer control unit 101 to process the packet in accordance with a rule and an action of the flow. For example, the transfer control unit 101 determines a transfer destination of the packet by the packet transfer unit 102, and notifies the packet transfer unit 102.

The FIB 104 is configured, for example, as a table with multiple entries, and each entry contains a rule and an action. The entries of the FIB are sometimes referred to as flows. The FIB is set by the virtual network switch processing unit. The FIB 104 is used as routing information for controlling packet transfer, and corresponds to transfer definition information.

Furthermore, when the corresponding flow is not set in the FIB 104, the transfer control unit 101 causes the packet transfer unit 102 to transmit the packet to the virtual network switch control unit 103. When the virtual network switch control unit 103 resolves a destination of the packet and sets a flow of the packet in the FIB 104, the transfer control unit 101 causes the packet transfer unit 102 to perform processing in accordance with this set flow.

—Packet Transfer Unit 102—

The packet transfer unit 102 transfers a packet between the physical port 107 and the virtual port 108 of the virtual machine 106, in the network switch 1. For example, the packet transfer unit 102 transfers (transmits) a packet received by the physical port 107, to a destination (the virtual port 108 of the virtual machine 106) determined by the transfer control unit 101.

In other words, for example, the packet transfer unit 102 functions as a first packet transfer control unit that transfers a processing target packet to a transfer destination on the basis of the FIB (the transfer definition information) 104.

Furthermore, the packet transfer unit 102 also transfers the packet to be transferred to the virtual network switch control unit 103, in addition to a destination port (the virtual port 108). In other words, for example, the packet transfer unit 102 transmits the packet to its original destination port and the virtual network switch control unit 103.

In other words, for example, the packet transfer unit 102 functions as a second packet transfer control unit that transfers a copy (a mirror transfer packet) of a processing target packet to the virtual network switch control unit 103 (the CPU 11a).

Hereinafter, the packet transfer unit 102 transferring a copy of the packet to the virtual network switch control unit 103 separately from its original destination port may be referred to as temporary mirror transfer. Furthermore, the packet transferred to the virtual network switch control unit 103 by this temporary mirror transfer may be referred to as a temporary mirror transfer packet. Furthermore, a flow to which this temporary mirror transfer packet belongs may be referred to as a temporary mirror transfer flow.

The packet transfer unit 102 sets a tag (identification information) indicating the fact of being temporary mirror transfer, for the temporary mirror transfer packet. This tagging may be performed, for example, by setting a flag in a specific region of a header of the packet.

The virtual network switch control unit 103 may detect that the packet is a temporary mirror transfer packet by referring to the header of the received packet.

Note that, in the network switch 1, the packet transfer by the transfer control unit 101 and the packet transfer unit 102 in the FPGA 11b may be referred to as offload.

—Virtual Network Switch Control Unit 103—

The virtual network switch control unit 103 performs control to realize a function as a virtual network switch in the network switch 1. The virtual network switch realizes software defined networking (SDN). The virtual network switch control unit 103 may be realized by, for example, a function of Open vSwitch.

The virtual network switch control unit 103 manages idle time (packet non-transfer time) of communication for a MAC address of a transmission source or a destination of a flow by using the MAC learning table 105.

FIG. 3 is a view exemplifying the MAC learning table 105 in the network switch 1 as an example of the embodiment.

The MAC learning table 105 exemplified in FIG. 3 associates idle time with a MAC address of a transmission source or a destination of a flow. By referring to the MAC learning table 105, it is possible to detect the MAC address of the transmission source or the destination of the flow whose idle time exceeds a predetermined threshold value.

When the virtual network switch control unit 103 receives a temporary mirror transfer packet from the packet transfer unit 102, which will be described later, the virtual network switch control unit 103 updates the MAC learning table 105. In other words, for example, the idle time corresponding to the MAC address of the flow in the MAC learning table 105 is set (reset) to 0.

Furthermore, the virtual network switch control unit 103 excludes the virtual network switch control unit 103 from a transfer destination of the flow. Furthermore, the virtual network switch control unit 103 discards the received temporary mirror transfer packet. This makes it possible to prevent double transfer of the temporary mirror transfer packet and also reduce unnecessary mirror processing.

Then, at the same time as updating the MAC learning table 105, excluding the virtual network switch control unit 103 from the transfer destination of the flow, and discarding the temporary mirror transfer packet described above, the transfer control unit 101 and the packet transfer unit 102 of the FPGA 11b perform transfer processing based on the FIB 104 in the above processing. In this way, when a packet arrives for the temporary mirror setting response flow, the MAC learning table 105 is updated, the virtual network switch control unit 103 is excluded from the flow transfer destination, the temporary mirror transfer packet is discarded, and the transfer processing based on the FIB 104 is performed.

The virtual network switch control unit 103 separately performs garbage collection (GC) for a flow whose idle time has passed a predetermined threshold value (for example, 600 seconds) or more in the MAC learning table 105, and deletes from the FIB 104. The threshold value of 600 seconds exemplified here is set on the assumption that, for example, it takes 300 seconds for the temporary mirror setting to be set and then 300 seconds for the GC to run. In other words, for example, the threshold value is set with the idle time set to 600 seconds from the first flow setting in the FIB 104 (in other words, for example, idle time of the corresponding entry in the MAC learning table 105 is set to 0) until the GC operates.

A GC target flow is a flow in which the virtual port 108 of the virtual network switch control unit 103 is added to the destination port. The virtual network switch control unit 103 performs transfer setting to the virtual network switch control unit 103, and deletes the flow, from the FIB 104, having a packet that does not arrive even after the threshold value (for example, 600 seconds) has passed.

Furthermore, even when a usage rate of the FIB 104 exceeds a certain ratio (for example, 80%), the virtual network switch control unit 103 deletes the GC target flows sequentially from one having the oldest time of registration to the MAC learning table 105.

In a case of satisfying either of these conditions that the packet does not arrive even after a predetermined threshold value (for example, 600 seconds) has passed since when the transfer setting to the virtual network switch control unit 103 has been performed, or that the usage rate of the FIB 104 exceeds a certain ratio (for example, 80%), the virtual network switch control unit 103 executes the GC for the corresponding flow. These two conditions are sometimes called GC conditions. The virtual network switch control unit 103 performs the GC processing when at least one of the GC conditions is satisfied.

Furthermore, the virtual network switch control unit 103 resolves a destination of a packet transmitted by the transfer control unit 101 since a flow is not set in the FIB 104. Note that this destination resolution may be realized by a known method, and the description thereof will be omitted.

The virtual network switch control unit 103 sets a flow of the packet for which the destination has been resolved, as a new entry in the FIB 104.

(B) Operation

Figure 4:
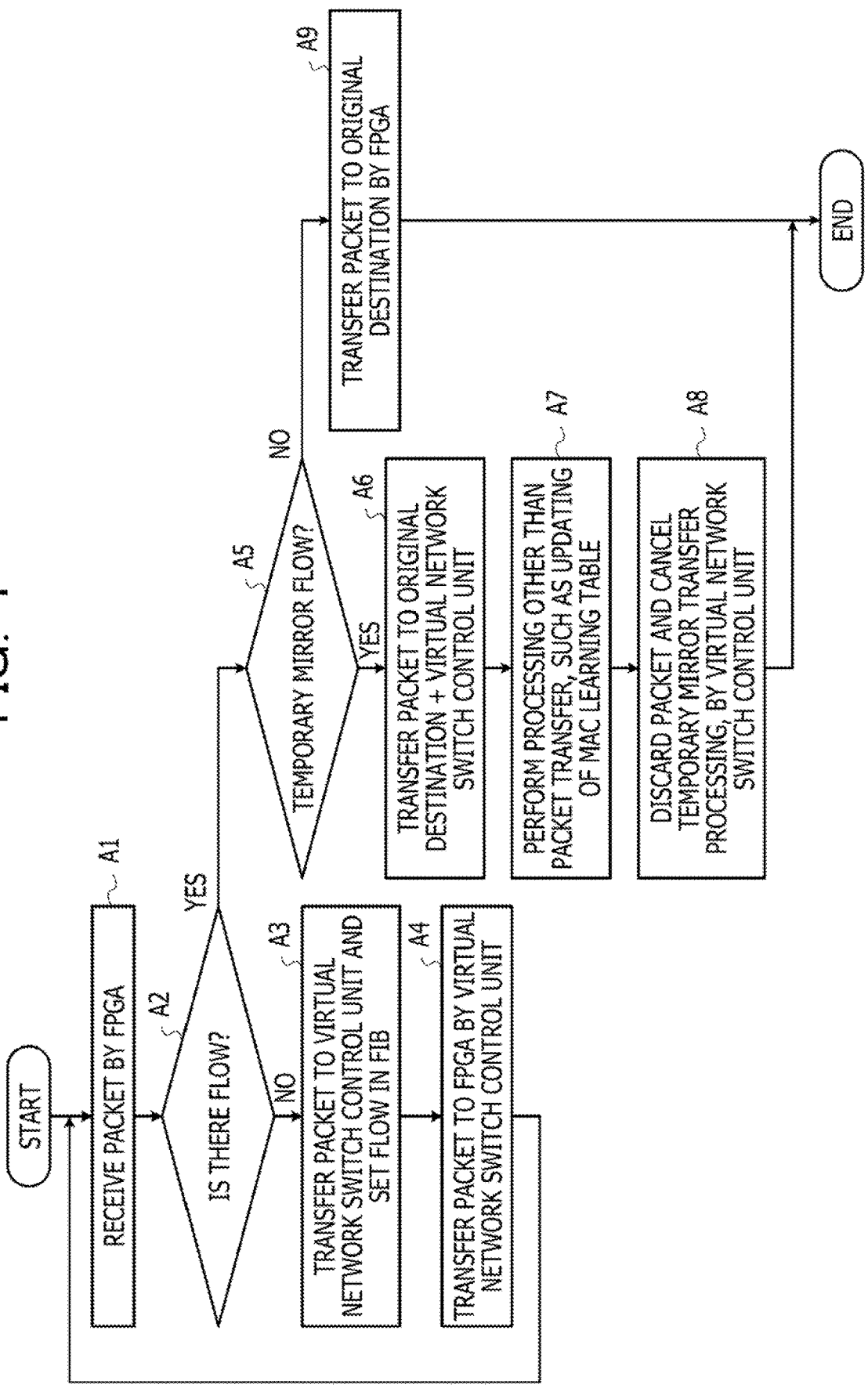
FIG. 4 is a flowchart for explaining packet processing in a network switch as an example of an embodiment.

Packet processing in the network switch 1 as an example of the embodiment configured as described above will be described with reference to flowcharts (steps A1 to A9) illustrated in FIG. 4.

In step A1, the FPGA 11b receives a packet transferred from the physical port 107. Hereinafter, the packet transferred by the packet transfer unit 102 may be referred to as a processing target packet.

In step A2, the transfer control unit 101 refers to the FIB 104 and checks whether a flow of the processing target packet exists as an entry in the FIB 104. When the flow of the processing target packet does not exist as an entry in the FIB 104 (see the NO route in step A2), the processing proceeds to step A3.

In step A3, the FPGA 11b transfers the processing target packet to the virtual network switch control unit 103. The virtual network switch control unit 103 resolves a destination of the processing target packet, and sets a flow of the processing target packet as an entry in the FIB 104.

In step A4, the virtual network switch control unit 103 transfers the processing target packet (performs packet transfer) to the FPGA 11*b*. Thereafter, the processing returns to step A1.

Furthermore, as a result of the checking in step A2, when the flow of the processing target packet exists as an entry in the FIB 104 (see the YES route in step A2), the processing proceeds to step A5.

In step A5, the transfer control unit 101 refers to a header of the processing target packet and checks whether the processing target packet is a temporary mirror transfer packet. In other words, for example, it is checked whether the processing target packet is related to a temporary mirror transfer flow.

As a result of the checking, when the processing target packet is a temporary mirror transfer packet (see the YES route in step A5), the processing proceeds to step A6.

In step A6, the transfer control unit 101 refers to the FIB 104, acquires a rule and an action of the flow, and acquires information on a transfer destination of the processing target packet. The packet transfer unit 102 transfers the processing target packet to an original destination of the processing target packet (for example, the virtual port 108 of the virtual machine 106). Furthermore, the packet transfer unit 102 also transfers the processing target packet as a mirror transfer packet to the virtual network switch control unit 103.

In step A7, the virtual network switch control unit 103 updates the MAC learning table 105 on the basis of the received mirror transfer packet. Furthermore, in addition to this, the virtual network switch control unit 103 may perform various known processing associated with packet transfer, such as updating statistical information.

In step A8, the virtual network switch control unit 103 discards the mirror transfer packet. Furthermore, the virtual network switch control unit 103 cancels setting, which has been set in the FIB 104, of the temporary mirror transfer of the flow to the virtual network switch control unit 103. Thereafter, the processing ends.

Furthermore, as a result of the checking in step A5, when the processing target packet is not a temporary mirror transfer packet (see the NO route in step A5), the processing proceeds to step A9.

In step A9, the transfer control unit 101 refers to the FIB 104, acquires a rule and an action of the flow, and acquires information on a transfer destination of the processing target packet. The packet transfer unit 102 transfers the processing target packet to an original destination of the processing target packet (for example, the virtual port 108 of the virtual machine 106). Thereafter, the processing ends.

Figure 5:
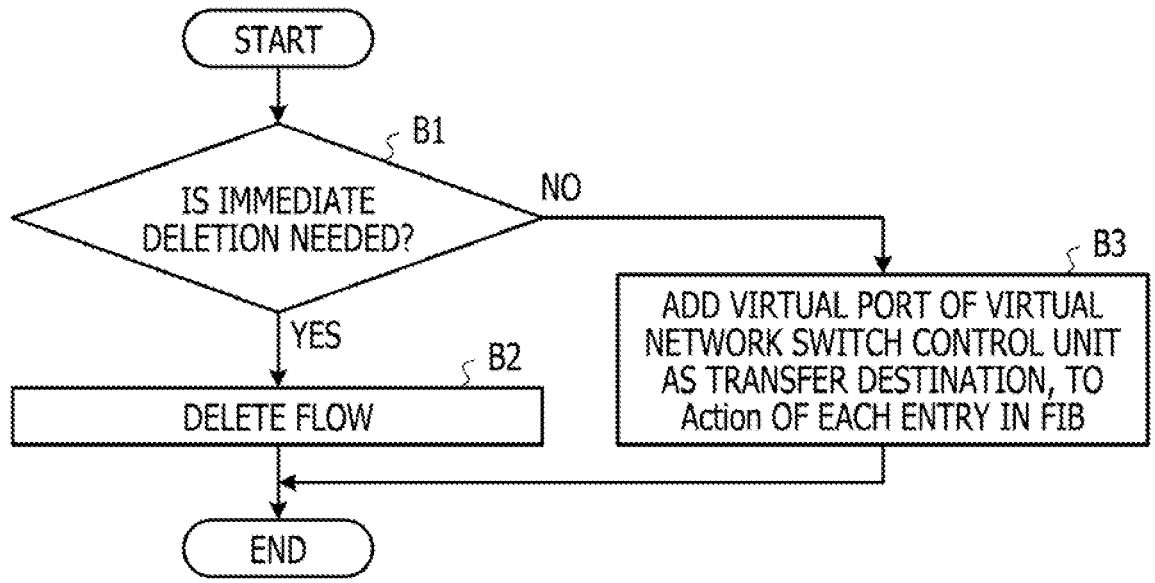
FIG. 5 is a flowchart for explaining an outline of flow deletion processing in a network switch as an example of an embodiment.

Next, an outline of flow deletion processing in the network switch 1 as an example of the embodiment will be described with reference to flowcharts (steps B1 to B3) illustrated in FIG. 5.

For example, when the virtual network switch control unit 103 detects that a MAC address of a transmission source or a destination of a flow has been aged out, the following processing is executed.

In step B1, the virtual network switch control unit 103 determines whether immediate deletion of the flow is needed. For example, when an execution instruction for flash processing is issued, or when a flow deletion instruction is issued by a user, it is determined that immediate execution of the flow is needed.

When immediate deletion of the flow is needed (see the YES route in step B1), in step B2, the virtual network switch control unit 103 deletes the flow from the FIB 104. For example, among entries registered in the FIB 104, a flow whose idle time is equal to or longer than a threshold value may be deleted. Thereafter, the processing ends.

Furthermore, as a result of the checking in step B1, when immediate deletion of the flow is not needed (see the NO route in step B1), in step B3, the virtual network switch control unit 103 adds the virtual port 108 of the virtual network switch control unit 103 as a transfer destination, to an action of an entry whose MAC address of a transmission source or a destination matches the aged out MAC address, in individual entries in the FIB 104. As a result, the temporary mirror transfer flow is set. Thereafter, the processing ends.

Figure 6:
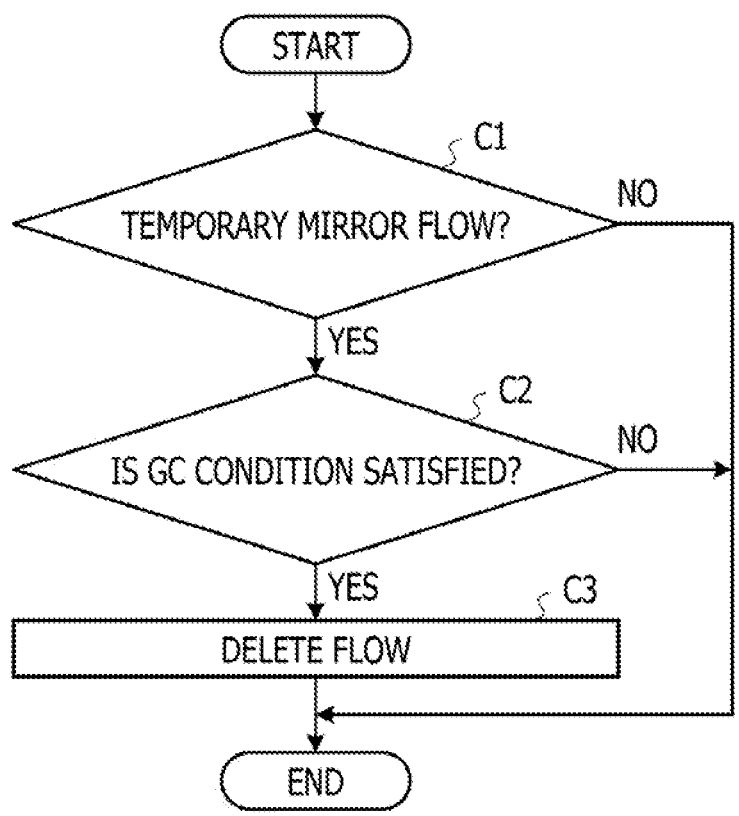
FIG. 6 is a flowchart for explaining GC processing in a network switch as an example of an embodiment.

Next, GC processing in the network switch 1 as an example of the embodiment will be described with reference to flowcharts (steps C1 to C3) illustrated in FIG. 6.

In step C1, the virtual network switch control unit 103 checks whether or not a flow is the temporary mirror transfer flow.

When the flow is the temporary mirror transfer flow (see the YES route in step C1), the processing proceeds to step C2. In step C2, the virtual network switch control unit 103 checks whether or not the GC condition is satisfied.

When the GC condition is satisfied (see the YES route in step C2), the flow is deleted from the FIB 104 in step C3. Thereafter, the processing ends.

Furthermore, when the flow is not the temporary mirror transfer flow in step C1 (see the NO route in step C1), and when the GC condition is not satisfied in step C2 (see the NO route in step C2), the processing ends.

Figure 7:
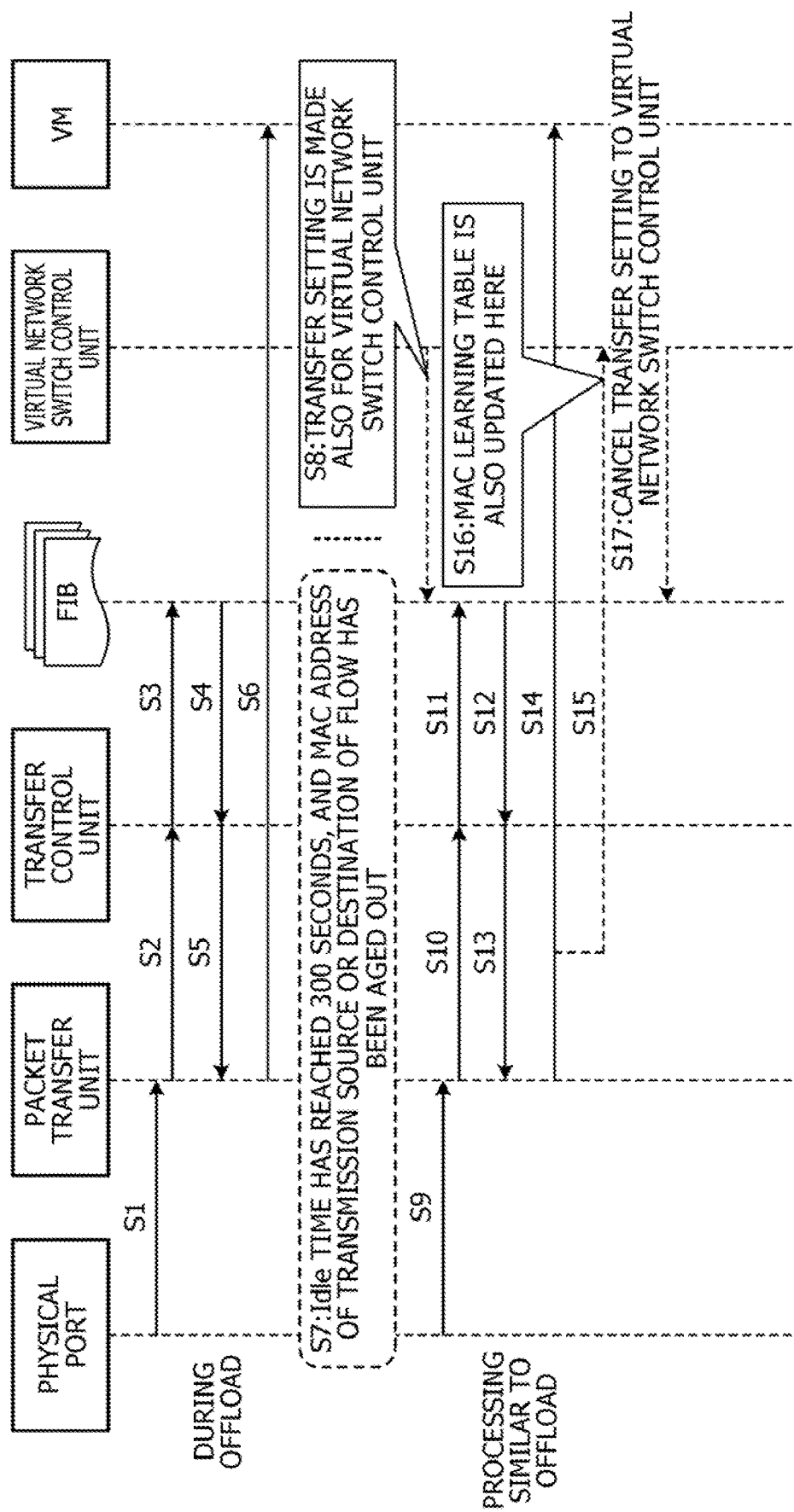
FIG. 7 is a sequence diagram for explaining active flow deletion processing in a network switch as an example of an embodiment.

Next, deletion processing of an active flow in the network switch 1 as an example of the embodiment will be described with reference to a sequence diagram illustrated in FIG. 7.

During offload, the packet received at the physical port 107 is passed to the packet transfer unit 102 (see reference numeral S1). The packet transfer unit 102 checks a transfer destination with the transfer control unit 101 (reference numeral S2), and the transfer control unit 101 refers to the FIB 104 (reference numeral S3) and acquires a processing method (a rule and an action) of the flow (reference numeral S4). The transfer control unit 101 instructs the packet transfer unit 102 of a transfer destination and the like (reference numeral S5), and the packet transfer unit 102 transfers the packet to the virtual port 108 of the virtual machine 106 of the destination in accordance with this instruction (reference numeral S6).

Here, the virtual network switch control unit 103 detects that the idle time has reached a predetermined threshold value (300 seconds in the present embodiment) and the MAC address of the transmission source or the destination of the flow has been aged out (reference numeral S7).

In the FIB 104, the virtual network switch control unit 103 sets a destination (performs transfer setting) such that the packet is also transferred to the virtual network switch control unit 103 for each flow (reference numeral S8). In other words, for example, setting is performed for adding, to each entry of the FIB 104, the virtual port 108 of the virtual network switch control unit 103 as a packet transfer destination.

Thereafter, when the physical port 107 receives the packet, processing similar to that during offload is executed. In other words, for example, the packet received at the physical port 107 is passed to the packet transfer unit 102 (see reference numeral S9). The packet transfer unit 102 checks a transfer destination with the transfer control unit 101 (reference numeral S10), and the transfer control unit 101 refers to the FIB 104 (reference numeral S11) and acquires a processing method (a rule and an action) of the flow (reference numeral S12). The transfer control unit 101 instructs the packet transfer unit 102 of a transfer destination and the like (reference numeral S13), and the packet transfer unit 102 transfers the packet to the virtual port 108 of the virtual machine 106 of the destination in accordance with this instruction (reference numeral S14).

Furthermore, the packet transfer unit 102 also transfers a packet (a temporary mirror transfer packet) to the virtual port 108 of the virtual network switch control unit 103 (reference numeral S15). The virtual network switch control unit 103 updates the MAC learning table 105 on the basis of the received temporary mirror transfer packet (reference numeral S16). Thereafter, the virtual network switch control unit 103 cancels the temporary mirror transfer to the virtual network switch control unit 103 (reference numeral S17). In other words, for example, the virtual port 108 of the virtual network switch control unit 103 set for the FIB 104 as the destination in the entry of the flow is deleted. As a result, the temporary mirror transfer is canceled, and only an original destination (for example, the virtual port 108 of the virtual machine 106) is set in the FIB 104 as the transfer destination of each packet. Thereafter, the processing ends.

Figure 8:
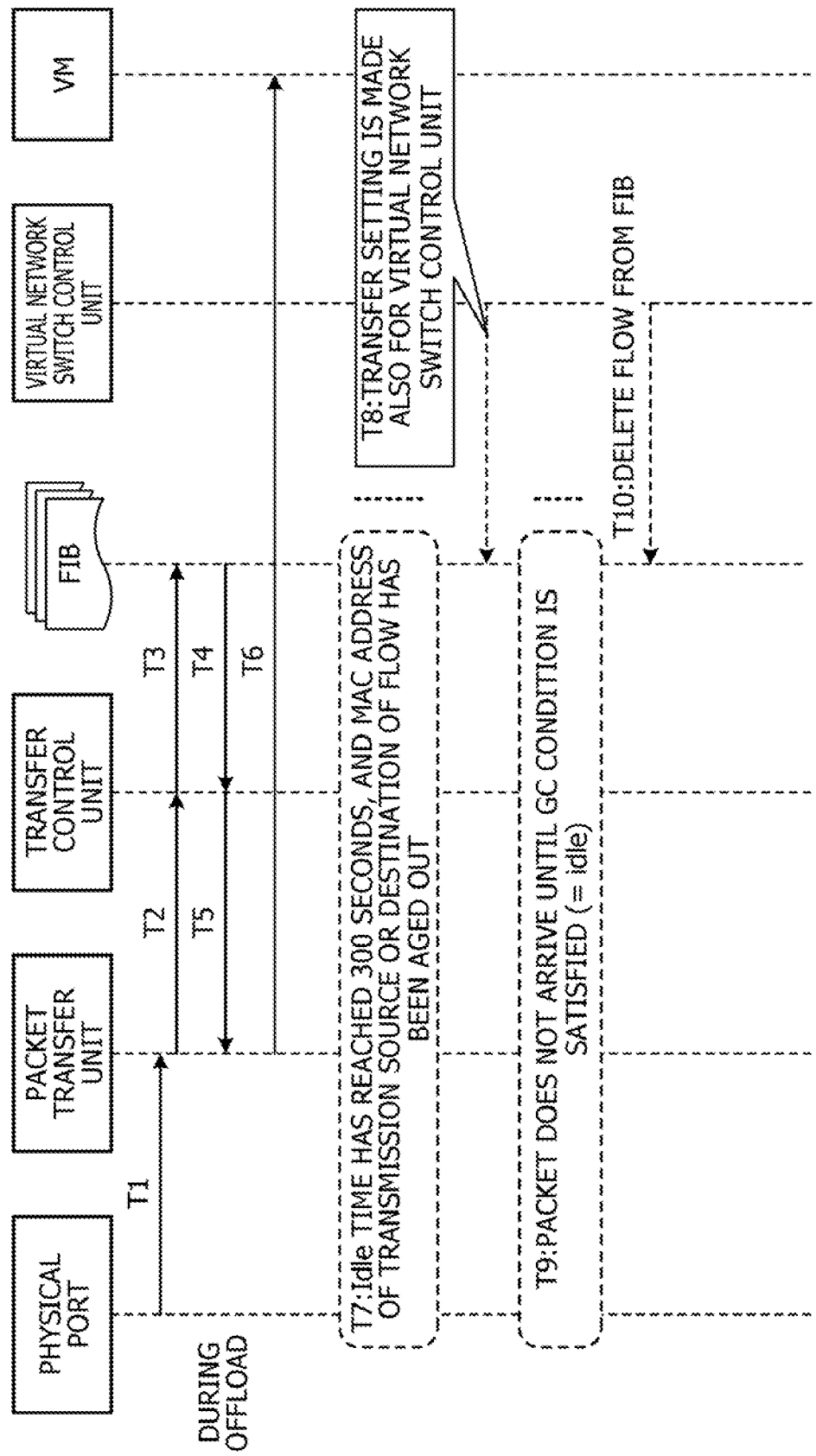
FIG. 8 is a sequence diagram for explaining deletion processing of a flow in an idle state in a network switch as an example of an embodiment.

Next, deletion processing of a flow in an idle state in the network switch 1 as an example of the embodiment will be described with reference to a sequence diagram illustrated in FIG. 8.

During offload, the packet received at the physical port 107 is passed to the packet transfer unit 102 (see reference numeral T1). The packet transfer unit 102 checks a transfer destination with the transfer control unit 101 (reference numeral T2), and the transfer control unit 101 refers to the FIB 104 (reference numeral T3) and acquires a processing method (a rule and an action) of the flow (reference numeral T4). The transfer control unit 101 instructs the packet transfer unit 102 of a transfer destination and the like (reference numeral T5), and the packet transfer unit 102 transfers the packet to the virtual port 108 of the virtual machine 106 of the destination in accordance with this instruction (reference numeral T6).

Here, the virtual network switch control unit 103 detects that the idle time has reached a predetermined threshold value (300 seconds in the present embodiment) and the MAC address of the transmission source or the destination of the flow has been aged out (reference numeral T7).

In the FIB 104, the virtual network switch control unit 103 sets a destination (performs transfer setting) such that the packet is also transferred to the virtual network switch control unit 103 for each flow (reference numeral T8).

In other words, for example, setting is performed for adding, to each entry of the FIB 104, the virtual port 108 of the virtual network switch control unit 103 as a packet transfer destination.

Thereafter, when the physical port 107 is brought into an idle state in which no packet is received (reference numeral T9) and the GC condition is satisfied, the virtual network switch control unit 103 deletes the flow from the FIB 104 (reference numeral T10).

(C) Effects

Thus, according to the network switch 1 as an example of the embodiment, the packet transfer performance may be improved by offloading the functions of the transfer control unit 101 and the packet transfer unit 102 to the FPGA 11b.

Furthermore, the packet transfer unit 102 transfers a packet received at the physical port 107 to a destination, and transfers a mirror transfer packet to the virtual network switch control unit 103.

The virtual network switch control unit 103 updates the MAC learning table 105 by using the received mirror transfer packet. Furthermore, the virtual network switch control unit 103 may manage statistical information by using the received mirror transfer packet.

As a result, even if the packet transfer function is offloaded to the FPGA 11b, the virtual network switch control unit 103 may manage the statistical information.

In the network switch 1, it is not necessary to delete the FIB entry in every periodic age-out (for example, every 300 seconds) as in a method of related technology, and active flow entries are not to be removed from the FIB 104. As a result, the virtual network switch control unit 103 does not need to perform processing such as destination resolution for an active flow, and high-speed packet transfer by the FPGA 11b (the transfer control unit 101 and the packet transfer unit 102) may be achieved.

Figure 9:
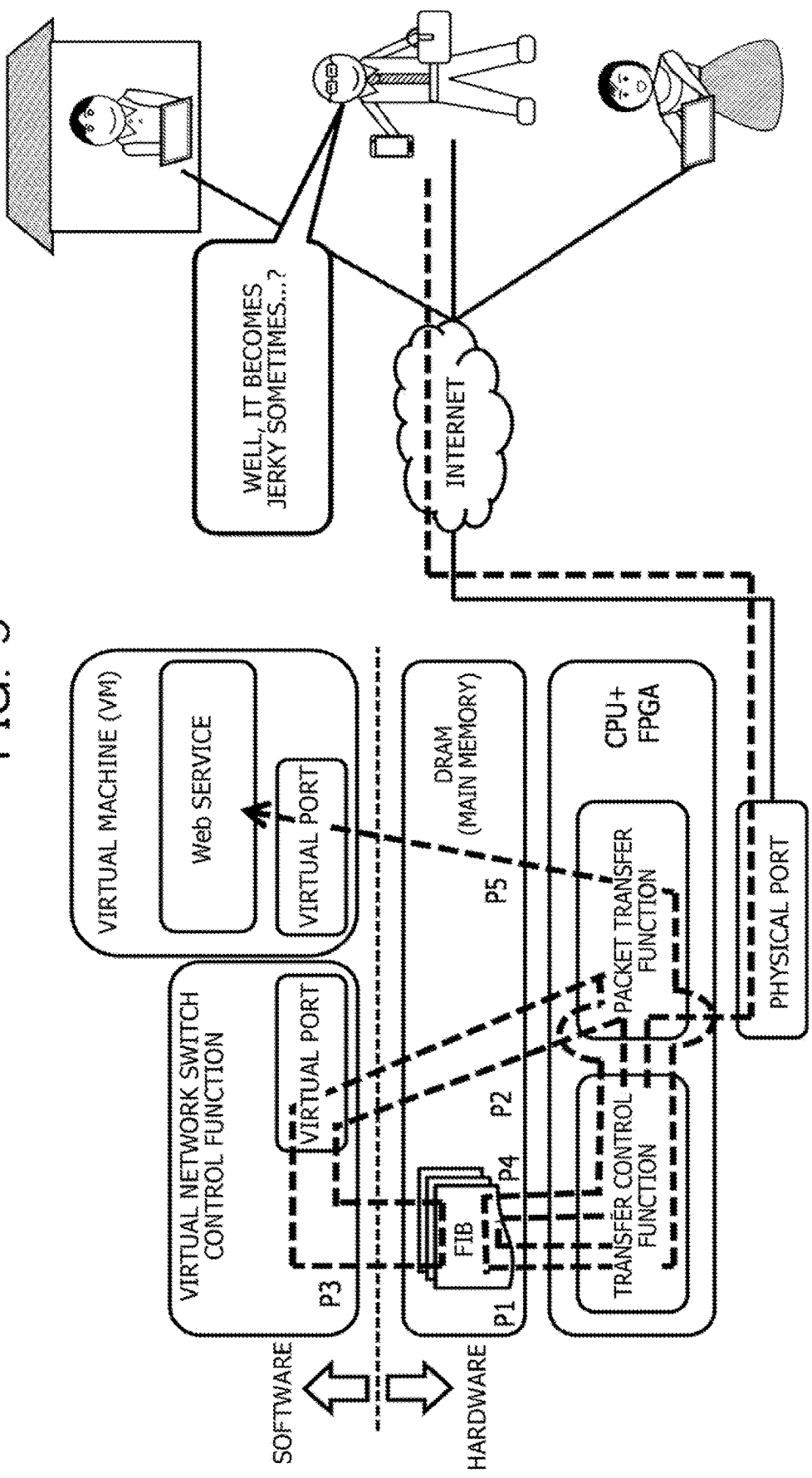
FIG. 9 is a diagram illustrating packet transfer processing when age-out occurs in a network switch of related technology.
Figure 10:
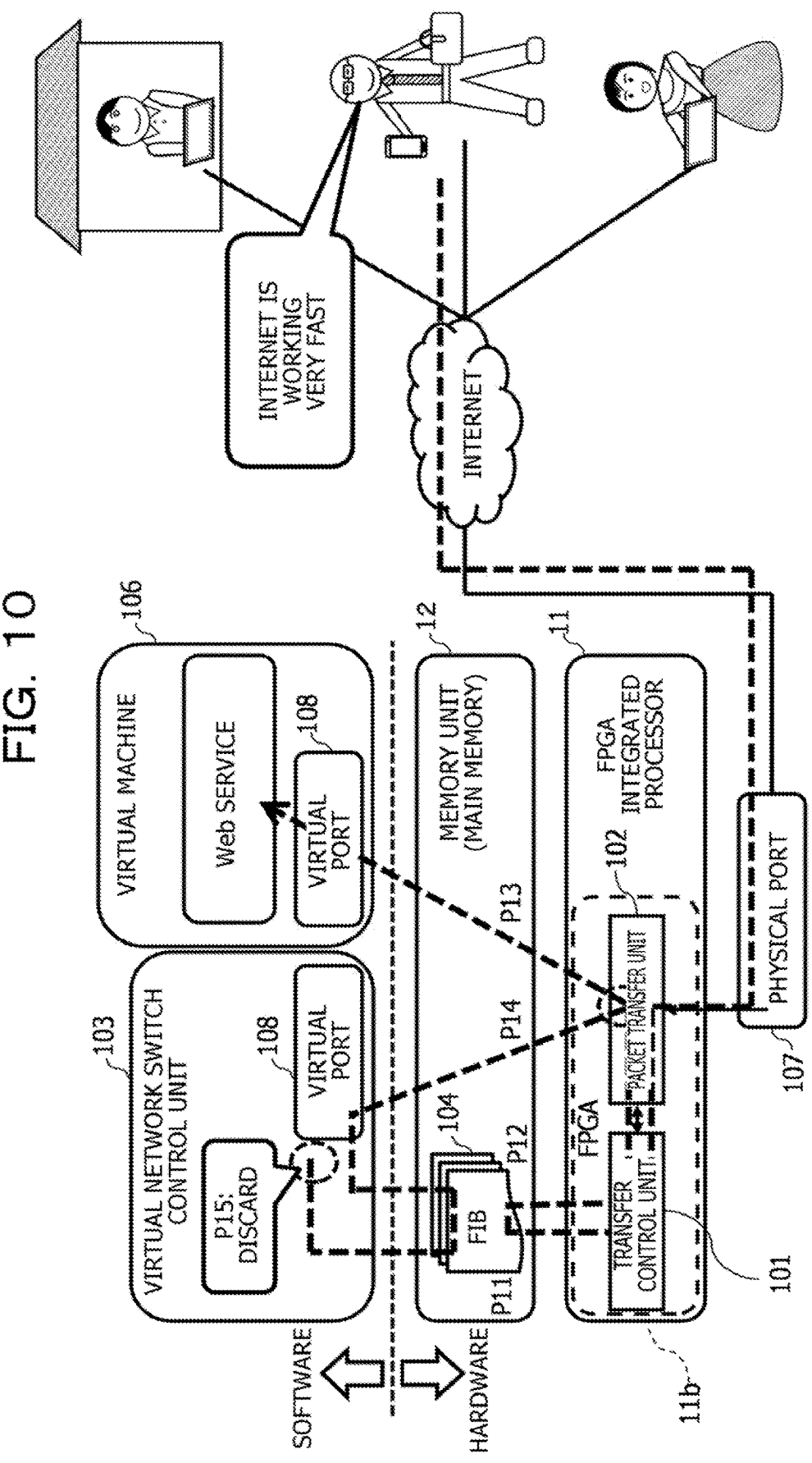
FIG. 10 is a diagram illustrating packet transfer processing in a network switch as an example of an embodiment.

FIG. 9 is a diagram illustrating packet transfer processing when age-out occurs in a network switch of related technology, and FIG. 10 is a diagram illustrating packet transfer processing in the network switch 1 as an example of the embodiment.

In the network switch of related technology exemplified in FIG. 9, the transfer control function and the packet transfer function are offloaded to the FPGA.

Furthermore, in these FIGS. 9 and 10, a flow of processing caused by packet transfer is indicated by a thick broken line.

As illustrated in FIG. 9, in a network switch of related technology, a flow entry is removed from the FIB when an age-out occurs. As a result, there is no corresponding flow even if the transfer control function refers to the FIB (reference numeral P1), and the packet transfer function transfers the packet to the virtual network switch control function (reference numeral P2). The virtual network switch control function performs destination resolution and the like for the received packet, and sets a flow in the FIB (reference numeral P3).

Thereafter, the transfer control function refers to the FIB again (reference numeral P4) and acquires a rule and an action of the corresponding flow, and the packet transfer function transfers the packet to a virtual machine of the destination (Web service) (reference numeral P5).

In other words, for example, in the network switch exemplified in FIG. 9 of related technology, since a flow entry is deleted from the FIB when an age-out occurs, processing by the virtual network switch control function occurs, which decreases a processing speed. When using the Web service, a user will feel a delay in processing such as screen display being jerky.

On the other hand, in the network switch 1, it is not necessary to delete an entry of an active flow from the FIB when an age-out occurs. As a result, for packet transfer in an active flow, as illustrated in FIG. 10, a corresponding flow exists when the transfer control function refers to the FIB 104 (reference numeral P11), and a rule and an action of the corresponding flow may be acquired (reference numeral P12). The packet transfer unit 102 causes the virtual machine of the destination (Web service) to transfer the packet by using information acquired by the transfer control unit 101 (reference numeral P13).

In this way, packet transfer for the user to use the Web service may be processed in the FPGA 11b, and the packet transfer may be processed at high speed. The user does not feel any delay in processing when using the Web service.

On the other hand, by the packet transfer unit 102 transmitting a mirror transfer packet to the virtual network switch control unit 103 (reference numeral P14), the virtual network switch control unit 103 may update the MAC learning table 105 and record statistical information for the FIB 104 on the memory unit 12. Note that, the mirror transfer packet transmitted to the virtual network switch control unit 103 is eventually discarded by the virtual network switch control unit 103 (reference numeral P15).

In the network switch 1, since it is not necessary to delete an entry of an active flow from the FIB when an age-out occurs, it is possible to prevent an occurrence of intermittent performance degradation due to age-out for active flows.

(D) Others

Then, the disclosed technology is not limited to the above-described embodiment, and various modifications may be made and implemented without departing from the scope of the present embodiment. Each configuration and each processing of the present embodiment can be selected or omitted as needed or may be appropriately combined.

For example, in the above-described embodiment, the network switch 1 includes the FPGA integrated processor 11 in which the CPU 11*a* and the FPGA 11*b* are integrated integrally, but the present embodiment is not limited to this. The CPU 11*a* and the FPGA 11*b* may be configured as separate bodies, and can be modified in various ways.

Furthermore, the present embodiment can be implemented and manufactured by those skilled in the art according to the above-described disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network switch comprising:
    a processor; and
    a field programmable gate array (FPGA) configured to:
        determine whether a processing target packet is a specific packet, based on transfer definition information;
        transfer, when the processing target packet is the specific packet, a copy of the processing target packet to the processor; and
    the processor is configured to:
        update transfer record information based on the copy of the processing target packet which is transferred from the FPGA;
        delete an entry of the transfer definition information based on the transfer record information which is updated;
        cause the FPGA to transfer the copy of the processing target packet, by setting a virtual port to the transfer definition information as a transfer destination of the processing target packet; and
        set the virtual port to the transfer definition information as the transfer destination of the processing target packet, when an immediate deletion request for an entry in the transfer definition information is not issued for a transmission source or a destination whose packet non-transfer time is equal to or longer than a threshold value in the transfer record information.

2. The network switch according to claim 1, wherein the FPGA sets identification information that indicates a fact of being a copy, to the copy of the processing target packet.

3. The network switch according to claim 1, wherein after the processor updates the transfer record information, the copy of the processing target packet is discarded.

4. The network switch according to claim 1, wherein the FPGA transfer, both when the processing target packet is not the specific packet and when the processing target packet is the specific packet, the processing target packet to the transfer destination.

5. A non-transitory computer-readable storage medium storing a program that causes a processor included in a network apparatus to execute a process, the process comprising:
    determining, by a field programmable gate array (FPGA), whether a processing target packet is a specific packet, based on transfer definition information;
    transferring, by the FPGA, when the processing target packet is the specific packet, a copy of the processing target packet to the processor;
    updating transfer record information based on a copy of the processing target packet which is transferred by the FPGA which is transferred from the FPGA;
    deleting an entry of the transfer definition information based on the transfer record information which is updated; and
    setting a virtual port to the transfer definition information as a transfer destination of the processing target packet, and causing to transfer the copy of the processing target packet,
    the setting includes setting the virtual port to the transfer definition information as the transfer destination of the processing target packet, when an immediate deletion request for an entry in the transfer definition information is not issued for a transmission source or a destination whose packet non-transfer time is equal to or longer than a threshold value in the transfer record information.

6. The non-transitory computer-readable storage medium according to claim 5, wherein the process further comprising causing the FPGA to determine the copy of the processing target packet based on identification information indicating a fact of being a copy, the identification information being set the copy of the processing target packet.

7. The network switch according to claim 5, wherein the process further comprising causing to discard the copy of the processing target packet after the updating.

8. The non-transitory computer-readable storage medium according to claim 5, wherein the processing target packet is transferred to the transfer destination both when the processing target packet is not the specific packet and when the processing target packet is the specific packet.

9. A control method performing by a network apparatus including a field programmable gate array (FPGA) and a processor, the control method comprising:
    determining, by the FPGA, whether a processing target packet is a specific packet, based on transfer definition information;
    transferring, by the FPGA, when the processing target packet is the specific packet, a copy of the processing target packet to the processor;

updating, by the processor, transfer record information based on the copy of the processing target packet which is transferred from the FPGA; deleting an entry of the transfer definition information based on the transfer record information which is updated; and setting, by the processor, a virtual port to the transfer definition information as a transfer destination of the processing target packet, and causing, by the processor, to transfer the copy of the processing target packet, the setting includes setting the virtual port to the transfer definition information as the transfer destination of the processing target packet, when an immediate deletion request for an entry in the transfer definition information is not issued for a transmission source or a destination whose packet non-transfer time is equal to or longer than a threshold value in the transfer record information.

10. The network switch according to claim 9, further comprising causing the FPGA to determine the copy of the processing target packet based on identification information indicating a fact of being a copy, the identification information being set the copy of the processing target packet.

11. The network switch according to claim 9, further comprising causing to discard the copy of the processing target packet after the updating.

12. The network switch according to claim 9, wherein the processing target packet is transferred to the transfer destination both when the processing target packet is not the specific packet and when the processing target packet is the specific packet.

* * * * *